(12) United States Patent
Frayer (10) Patent No.: US 9,706,094 B2
(45) Date of Patent: Jul. 11, 2017

(54) HYPERCHROMATIC LENS FOR RECORDING TIME-RESOLVED PHENOMENA

(71) Applicant: National Security Technologies, LLC, Las Vegas, NV (US)

(72) Inventor: Daniel K. Frayer, Los Alamos, NM (US)

(73) Assignee: National Security Technologies, LLC, North Las Vegas, NV (US)

( * ) Notice: Subject to any disclaimer, the term of this patent is extended or adjusted under 35 U.S.C. 154(b) by 151 days.

(21) Appl. No.: 14/850,828

(22) Filed: Sep. 10, 2015

(65) Prior Publication Data

US 2016/0165105 A1 Jun. 9, 2016

Related U.S. Application Data

(60) Provisional application No. 62/088,475, filed on Dec. 5, 2014.

(51) Int. Cl.
*H04N 5/225* (2006.01)
*H04N 5/235* (2006.01)
(Continued)

(52) U.S. Cl.
CPC ......... *H04N 5/2254* (2013.01); *G02B 5/1842* (2013.01); *G02B 27/4272* (2013.01);
(Continued)

(58) Field of Classification Search
CPC .. H04N 5/2254; H04N 5/2354; H04N 5/2256; H04N 5/23212; H04N 13/0207;
(Continued)

(56) References Cited

U.S. PATENT DOCUMENTS 5,610,734 A 3/1997 Aharoni et al.
5,682,262 A 10/1997 Wefers et al.
(Continued)

FOREIGN PATENT DOCUMENTS

DE 102005006723 B3 6/2006
JP 2011-085432 A2 4/2011
(Continued)

OTHER PUBLICATIONS

"Ultra-high-speed optical coherence tomography with a stretched pulse supercontinuum source",Sucbei Moon and Dug Young Kim, Nov. 27, 2006, vol. 14, No. 24/Optics Express 11575, Nov. 27, 2006.
(Continued)

*Primary Examiner* — Albert Cutler
(74) *Attorney, Agent, or Firm* — Weide & Miller, Ltd.

(57) ABSTRACT

A method and apparatus for the capture of a high number of quasi-continuous effective frames of 2-D data from an event at very short time scales (from less than $10^{-12}$ to more than $10^{-8}$ seconds) is disclosed which allows for short recording windows and effective number of frames. Active illumination, from a chirped laser pulse directed to the event creates a reflection where wavelength is dependent upon time and spatial position is utilized to encode temporal phenomena onto wavelength. A hyperchromatic lens system receives the reflection and maps wavelength onto axial position. An image capture device, such as holography or plenoptic imaging device, captures the resultant focal stack from the hyperchromatic lens system in both spatial (imaging) and longitudinal (temporal) axes. The hyperchromatic lens system incorporates a combination of diffractive and refractive components to maximally separate focal position as a function of wavelength.

21 Claims, 6 Drawing Sheets

(51) Int. Cl.
*G02B 27/42* (2006.01)
*H04N 5/232* (2006.01)
*G02B 5/18* (2006.01)
*H01S 3/00* (2006.01)

(52) U.S. Cl.
CPC ......... *H04N 5/2256* (2013.01); *H04N 5/2354* (2013.01); *H04N 5/23212* (2013.01); *H01S 3/0057* (2013.01)

(58) Field of Classification Search
CPC ............ H04N 13/0271; G02B 27/4272; G02B 5/1842; H01S 3/0057; G01N 29/069; G01S 7/4865; G01S 17/08–17/36
USPC ................................................ 356/5.01–5.08
See application file for complete search history.

(56) References Cited

U.S. PATENT DOCUMENTS

| | | | |
|---|---|---|---|
| 5,790,242 | A | 8/1998 | Stern et al. |
| 6,618,125 | B2 * | 9/2003 | Stann ...................... G01S 7/486 348/302 |
| 7,161,671 | B2 | 1/2007 | Shibata et al. |
| 7,224,540 | B2 | 5/2007 | Olmstead et al. |
| 7,933,010 | B2 | 4/2011 | Rahn et al. |
| 8,005,314 | B2 | 8/2011 | Ortyn et al. |
| 8,587,772 | B2 | 11/2013 | Sesko et al. |
| 2003/0076485 | A1 * | 4/2003 | Ruff ........................ G01S 7/491 356/5.09 |
| 2003/0133109 | A1 * | 7/2003 | Murguia ............... G01J 3/2823 356/326 |
| 2005/0078296 | A1 * | 4/2005 | Bonnet ................. G01S 17/325 356/5.01 |
| 2006/0012797 | A1 * | 1/2006 | Chang ....................... G01J 3/02 356/484 |
| 2006/0197937 | A1 * | 9/2006 | Bamji ...................... G01C 3/08 356/5.01 |
| 2013/0336345 | A1 * | 12/2013 | Kim ......................... H01S 3/14 372/25 |
| 2014/0078352 | A1 * | 3/2014 | Iwai ...................... H04N 5/217 348/241 |
| 2014/0103018 | A1 * | 4/2014 | Squier ................ B23K 26/0624 219/121.61 |
| 2016/0350573 | A1 * | 12/2016 | Kitchens, II ......... G06K 9/0002 |

FOREIGN PATENT DOCUMENTS

| | | |
|---|---|---|
| WO | WO 96/41123 | 12/1996 |
| WO | WO 2009/153067 A2 | 12/2009 |

OTHER PUBLICATIONS

"Opto-mechanical design of a chromotomographic imager direct-vision prism element", Coon, T.E., Report: AFIT-ENY-13-M-07, 125p., Mar. 31, 2013.
"Tunable hyperchromatic lens system for confocal hyperspectral sensing" Phuong-Ha Cu-Nguyen, Adrian Grewe, Matthias Hillenbrand, Stefan Sinzinger, Andreas eifert and Has Zappe, Optics Express, vol. 21, Issue 23, pp. 27611-27621 (2013), Dec. 31, 2013.

* cited by examiner

HYPERCHROMATIC LENS FOR RECORDING TIME-RESOLVED PHENOMENA

1. PRIORITY CLAIM

This application claims priority to and the benefit of U.S. Provisional Patent Application No. 62/088,475 filed on Dec. 5, 2014, the contents of which are incorporated by reference in its entirety herein.

2. STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

3. FIELD OF THE INVENTION

The invention relates to high speed image capture systems and in particular to a method and apparatus for a high speed image capture system using a hyperchromatic lens.

4. BACKGROUND

When doing scientific research or material interaction studies, it is often beneficial to record an event which occurs during an ultra-short time scale, such as less than one nanosecond (ns). By maximizing the amount of captured or recorded information, the event may be better understood during post event analysis. However, numerous challenges exist when recording events that occur on an ultra-short time scale.

A number of methodologies are currently available for capturing optical phenomena at ultra-short time scale, but they suffer from a number of limitations. Framing cameras which utilize electro-optic tube are one common prior art system for recording images or event data. However, the temporal resolution of framing cameras employing electro-optic tubes is limited by tube physics, in the case of single-tube imaging, and radiometry, in the case of multiple-path configurations utilizing either tubes or micro channel plates.

Another type of camera is streak cameras. The temporal resolution of electro-optic streak cameras can be substantially higher than framing cameras, but with the loss of an entire dimension of data. As such, streak cameras are able to record continuous data, but do so with a view of a single line of data and thus only record data along one particular line (streak). This drawback limits the amount of useful data that can be obtained.

In addition, some prior art systems for recording these events attempt to capture more data by adding optical recording devices, such as using multiple cameras. While this proposed solution did capture more data, it presented several other drawbacks. One such drawback is that synchronization of multiple cameras is difficult, particular for ultra-high speed operation. In addition, each additional camera system increases cost and often, dimensional limitations of the space around the event limits the number of cameras which may be used and limits the acceptable angles of image capture.

Therefore, a need exists for an improved camera system to capture high speed and ultra-high speed events.

SUMMARY

To overcome the drawbacks of the prior art, the innovation disclosed below allows capture and recordation of various phenomena at substantially shorter time scales than previously possible. An all-optical recording methodology is desired, i.e., one that does not require conversion of signal photons to electrons and thus would not be subject to the restrictions imposed by electro-optic tube physics. Such a system could demonstrate improved performance by several metrics: system efficiency, total recording time, and effective number of frames. However, it was discovered that effects that allow for fast manipulation of optical signals, such as the electro-optic Kerr and Pockels effects, while approaching nanosecond speeds, are insufficiently sensitive and cannot be utilized to produce a high number of frames.

To overcome the drawbacks of the prior art, research was performed into a novel all-optical methodology for the capture of a high number of quasi-continuous effective frames of 2-D data at very short time scales (from less than $10^{-12}$ to more than $10^{-8}$ seconds), with potential improvement over existing technologies in terms of short recording windows and number of frames, for specific application in light-matter interaction studies and potential application in focused studies of dynamic materials. This methodology combines (1) a chirped laser pulse to encode temporal phenomena onto wavelength; (2) a strong hyperchromatic lens to create a focal stack mapping wavelength onto axial position; and (3) a three-dimensional (3-D) recording technology to capture the resultant focal stack with axial position information in total. In one embodiment, the system is used with a plenoptic camera or a hologram (digital or film). The lens and recording mechanism are, over the length of the recorded phenomena, agnostic or indifferent to time, as the temporal characteristics are dependent only on the illumination source.

One example embodiment is presented as a system for recording high speed events that includes a light source configured to generate a chirped pulse. The chirped pulse is directed to an event to create a modified chirped pulse. A hyperchromatic lens system is positioned and configured to receive the modified chirped pulse and output two or more images focused at different distances from the hyperchromatic lens system. An image capture system is positioned and configured to record the two or more images, which are focused at different distances from the hyperchromatic lens system, to create and store image data.

In one embodiment, the chirped pulse source comprises a laser and optical pulse stretcher or chirper. The hyperchromatic lens system may include a lens system with one diffractive element although in other embodiments, greater than one diffractive element may be used. Acrylic material was selected but other materials may be used.

The image capture system may be a plenoptic camera. This system may further comprise a processor configured to execute machine readable code such that the machine readable code is stored on a memory and configured to process the image data to isolate and display a first image and a second image from the two or more images. In one embodiment, the hyperchromatic lens system is a focal stack which maps wavelength of the reflected chirped pulse into an axial position relative to the hyperchromatic lens system.

Also disclosed is hyperchromatic lens system for recording time-resolved phenomena that comprises multiple components that operate together to record multiple images. In one configuration this includes a pulse generator configured to generate a pulse and an optical chirper or pulse stretcher configured to expand the pulse to create a chirped pulse. The chirped pulse is directed to a time-resolved phenomenon to interact with the time-resolved phenomenon, creating a modified chirped pulse. A hyperchromatic lens system is configured to receive the modified chirped pulse representing information about the time-resolved phenomenon. The hyperchromatic lens system also processes the modified chirped pulse representing information about the time-resolved phenomenon to create two or more independent images. The processing establishes the two or more independent images at different distances from the hyperchromatic lens system. An image capture system is also provided and is configured to capture and store the two or more independent images.

In one embodiment, the pulse is an optical pulse in the visible light spectrum. In one embodiment, the pulse stretcher uses diffraction gratings to stretch and chirp the optical pulse to create a chirped pulse. In one configuration the hyperchromatic lens system comprises a multiple lens system configured with at least two diffractive elements. It is also contemplated that the image capture system may be a plenoptic camera or a holographic image capture system. The system may further comprise a processor configured to receive data representing two or more independent images and process the data to isolate and individually display the two or more independent images.

Also disclosed is a method for capturing high speed image information regarding a dynamic event. This method provides a chirped pulse to a phenomenon such that the chirped pulse interacts with the phenomenon to create a modified chirped pulse, and the modified chirped pulse contains information on the initial chirped pulse's interaction with the event. The phenomenon at a first time is associated with a first wavelength in the modified chirped pulse and the event at a second time is associated with a second wavelength of the modified chirped pulse. The method of operation receives the modified chirped pulse at a hyperchromatic system, such as a lens system with diffractive elements. Next, this method of operation outputs the modified chirped pulse from the hyperchromatic system such that the first wavelength is presented as a first image at a first distance from the hyperchromatic system and the second wavelength is presented as a second image at a second distance from the hyperchromatic system. An image capture device records the first image and the second image to create image capture device data.

The initial chirped pulse may be from a laser such that multiple wavelengths simultaneously present in the pulse are separated so that the phenomenon with which the pulse interacts is illuminated by a different wavelength at each instant in time. There are different ways to produce a chirped pulse. The most common uses an ultrashort-pulse laser and stretches and chirps the pulse, but there are any number of ways that this could be accomplished. The method developed uses a laser. For long timescales, multiple lasers or other sources could be employed.

It is also contemplated that the image capture device may comprise a plenoptic camera. The hyperchromatic system may comprise a lens stack including at least one diffractive element. It is contemplated that this method may further comprise processing the image capture device data to isolate first image data from the image capture device data and processing the image capture device data to isolate second image data from the image capture device data. It is contemplated that this method may enable displaying the first image data on a display screen and displaying the second image data on the display screen separately.

The distance between the images, in a linear or axial format it greater than in prior art designs. The first distance and the second distance may be considered as defining a maximum distance between images (a first image and a last image) and the maximum distance is greater than 1 meter. As an improvement over the prior art and as a novel aspect to the innovation, a hyperchromat lens system with 3d imaging capability establishes images at different planes to translate time to spatial linear distance, which each image detectable by a imaging system that records the image at two or more distances (planes) from the image system len(s).

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Disclosed is methodology and a system for capturing time-resolved 2-D data of non-repeating dynamic fast or ultra-fast (high speed and ultra-high speed) events. This methodology and system incorporates an optical illumination source in which wavelength is dependent on time, a hyperchromatic lens that images information at different wavelengths at longitudinally separated focal planes, and a 3-D optical recording device. An optical design innovation results in a disclosed design for a hyperchromatic lens with longitudinal chromatic aberration capable of displacing image planes by 9 mm/nm of incident illumination with near-diffraction-limited imaging performance, as an exemplary implementation. Fabrication and assembly produced a first article hyperchromat.

Figure 1A:
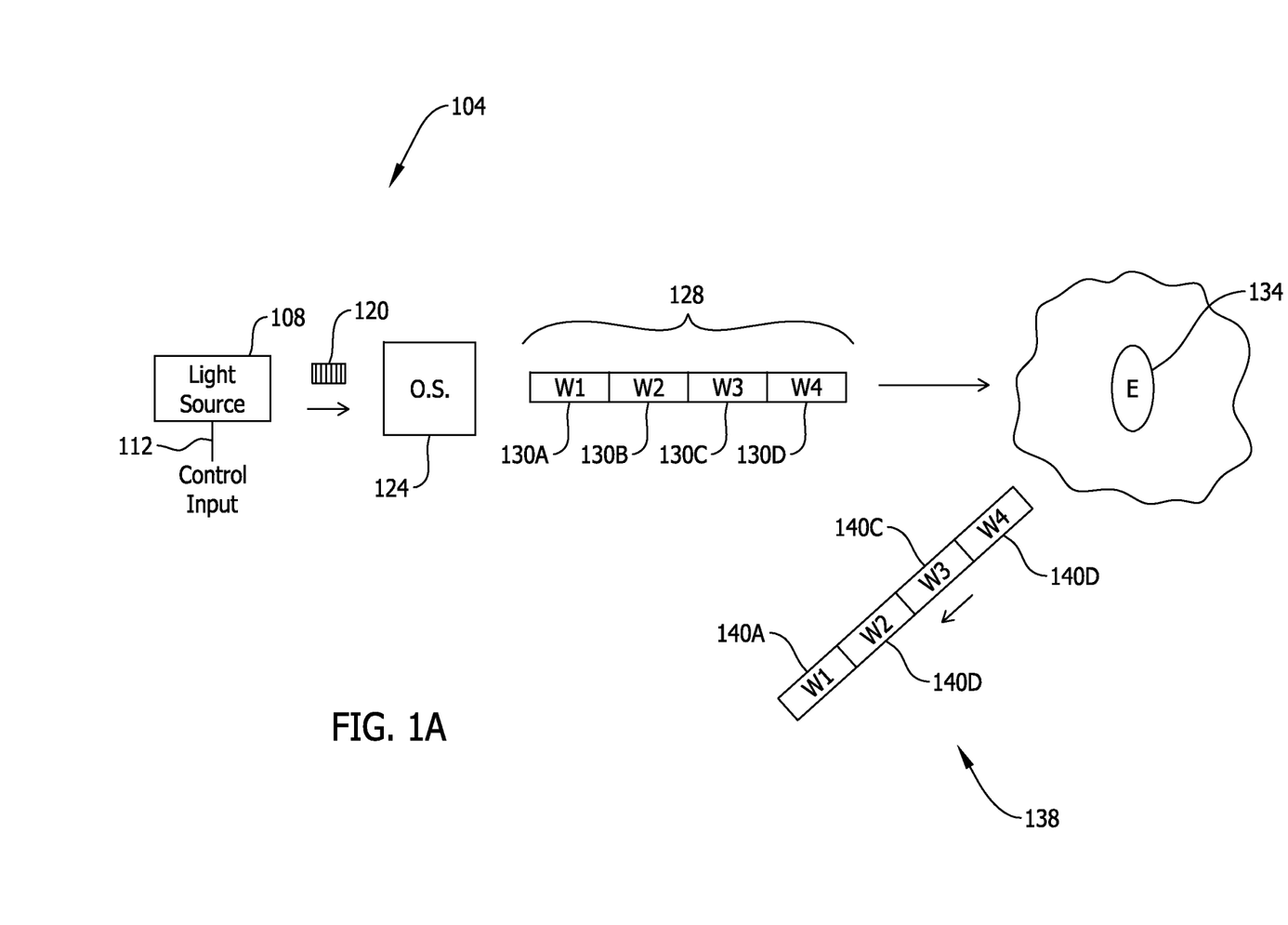
FIG. 1A is a block diagram of a chirped pulse generator and illuminated event.
Figure 1B:
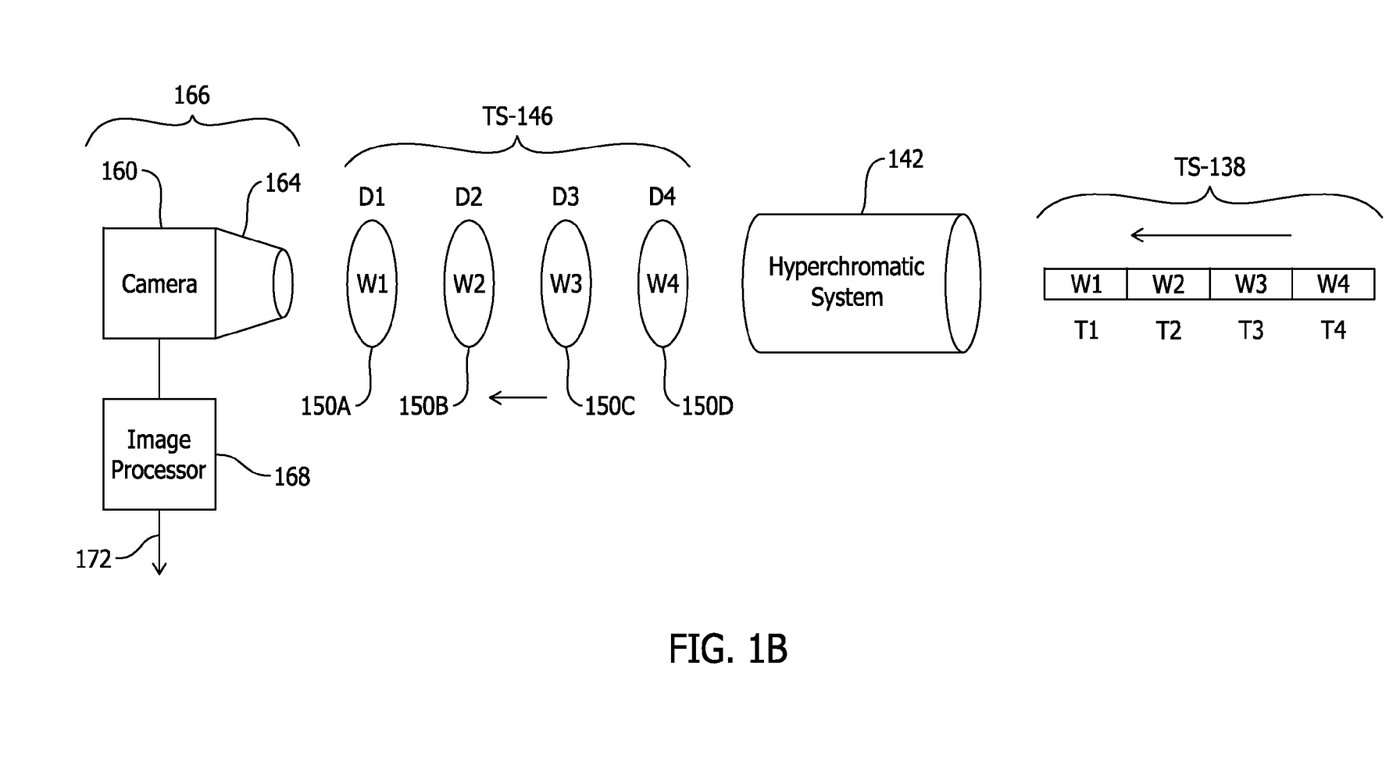
FIG. 1B is a block diagram of a hyperchromatic lens system and image capture system configured to receive a reflected or modified chirped pulse.

FIG. 1 illustrates a block diagram of a chirped pulse generator and illuminated event. This embodiment is exemplary in nature and is not intended to show every element or part of the innovation. In this example embodiment, a light source 108 is configured to direct optical output in the form of a pulse 120 of light energy. A control input 112 is provided to the light source. The control input 112 may include power, logic or analog inputs, or a trigger signal. A trigger signal may be used for timing of the pulse 120 for synchronization with other components shown in FIGS. 1A and 1B.

In this example embodiment the light source 108 comprises a laser, such as a femtosecond-class short-pulse doubled Nd:YAG laser. In other embodiments the light source 108 may be, but is not limited to, a visible or invisible short-pulse laser, a system producing discrete pulses of varying wavelength, or any other type light source which emits a pulse or stream of light.

The pulse 120 is directed to an optical pulse stretcher 124. For this document, the optical pulse stretcher 124 is a device that lengthens the illumination pulse to chirp the pulse, i.e. to create a longer (chirped) pulse in which wavelength is a function of time. In one embodiment, pulse chirping (stretching) may be performed with a fiber optic cable of a selected length. In one embodiment, stretching may be performed with diffractive optical components. In one embodiment, the expansion stretches a 10 femtosecond pulse to a chirped pulse of 100 picoseconds, although in other embodiments other numeric values may be achieved. This is a variable value and provided only for discussion. Other applications will utilize different pre-chirp and post-chirp pulse durations. Pulse stretching is generally known by one of ordinary skill in the art and is thus not described in great detail herein. Companies that offer pulse stretchers include OptiGrate Corp, located in Oviedo, Fla.; TeraXion located in Quebec, Canada; and Ondax, Inc, located in Monrovia, Calif.

The output of the pulse stretcher 124 is a chirped pulse. As compared to the pulse 120, the chirped pulse 128 includes optical signals at wavelength W1 130A, W2 130B, W3 130C, W41 130. These different wavelengths may also be referred to as colors, although the human eye may not be able to distinguish the color differences if the wavelengths are close in value. After the pulse is chirped to create the chirped pulse, the chirped pulse is directed to an event to illuminate or irradiate the event. The benefit of using the chirped pulse 128 instead of the pulse 120 is that the chirped pulse provides illumination in which, at each instant in time, only one wavelength is effectively present.

As shown in FIG. 1A, the chirped pulse 128 is then directed to and interacts with an event 134. The event may be any type of event. In one example embodiment the event is a event occurring on a surface, or representable as a two-dimensional surface event. In any environment or for any type of event, the light energy from the chirped pulse 124 that is directed to the event 134 may pass through the event and be received, minus any light energy absorbed by the event, or may reflect from the event and be received, minus any absorbed light energy at a lens or camera system. The reflected, or transmitted pulse is referred to as the post-event pulse 138 and is defined as the pulse after it has interacted with the event. In this discussion, the post-event pulse is a reflection. The post-event pulse 138 includes the reflections 140A, 140B, 140C, and 140D which are sequentially arranged as shown. These reflections 138, as with any image, represent the event. Each section W1-W4 of the reflection represent the event at a different time due to the sequential nature of the pulse 128 and 138. Although shown with four sections, which may be considered different wavelengths W1-W4, it is contemplated that any number of sections or wavelengths may be part of the expanded pulse 128 and resulting reflected pulse. Although shown as sections, the pulse is continuous in wavelength, but spread over a greater timespan. These sections W1, W2, W3, W4 may also be considered as occurring in time at sequential time T1, T2, T3, T4 such that the expanded pulse illuminates the event as the event is occurring. The event at T1 is represented by the reflection section W1, which corresponds to a discrete wavelength. Likewise, the event at T2 is represented by the reflection section W2, which also corresponds to a discrete wavelength. To aid in understanding, the different wavelengths may be considered different colors, but due to the narrow wavelength band of the chirped pulse 128, the difference in color would not be perceptible to a human eye. In one configuration, the width of the chirped pulse is only 5 nanometers, but in other embodiments, other pulse widths may be utilized.

Turning now to FIG. 1B, the reflected pulse 138 is presented or directed to a hyperchromatic system, such as a hyperchromatic lens system. The hyperchromatic system 142 is a device configured to focus light of different wavelengths at different focal planes. In a traditional lens, such as a lens used for film or digital photography, the lens is commonly configured to focus multiple colors (wavelengths of light) onto a single focal plane. In contrast, the hyperchromatic system 142 focuses or places each wavelength at different distances from the back (or some other reference point) of the hyperchromatic system 142. The hyperchromatic system 142 is discussed below in greater detail in connection with FIG. 2.

As shown in FIG. 1B, the output of the hyperchromatic system 142 is represented as images of the event which occur at different distances from the hyperchromatic system 142. The image section 150A (corresponding to the event at time T1) resulting from the pulse W1 is located at distance D1 from the hyperchromatic system 142. The image section 150B (corresponding to the event at time T2) resulting from the pulse W2 is located at distance D2 from the hyperchromatic system 142. The image section 150C (corresponding to the event at time T3) resulting from the pulse W3 is located at distance D3 from the hyperchromatic system 142. The image section 150D (corresponding to the event at time T4) resulting from the pulse W4 is located at distance D4 from the hyperchromatic system 142. Stated another way, there is a different focal plane for each section W1-W4 (wavelength) and each focal plane is a different distance from a lens of the hyperchromatic system.

The range of images 150A-150B as shown do not appear at the same time. the time over which the hyperchromatic system 142 focuses or presents the range of images 150A-150D is equal to the length of the chirped pulse. This duration is expected to be generally shorter than the integration time of any employed image capture device, thus allowing the image capture device the ability to capture all of the images simultaneously.

Positioned to view the images 150A-150D are one or more image capture devices 160. In this embodiment, the image capture device is shown with an associated lens system 164 and the device and lens are collectively referred to as a camera 166. In one embodiment, the only lens in the 'lens system 164' is the hyperchromat lens. The camera captures the images 150 which are presented at the locations D1-D4. In this exemplary embodiment the camera 166 comprises a plenoptic camera. A plenoptic camera (also known as a light field camera) is a device that captures information about the intensity of light in a scene, and also captures information about the direction that the light rays are traveling in space. One type of light field camera uses an array of micro-lenses placed in front of an otherwise conventional image sensor to sense intensity and directional information. Holographic recording systems may also be used, and may be digital or film-based Two sources for plenoptic camera are Raytrix Inc. located in Germany and Lytro Inc, located in Mountain View, Calif. Although described as a plenoptic camera, the camera 166 can be any device that is sensitive to and able to record both spatial and depth information from the hyperchromatic system 142.

In operation, the camera 166 is active during the presentation of images 150 and is able to capture in focus data at each distance D1-D4, thereby capturing image data for each of the images 150A-150D.

In general, plenoptic cameras are sensitive to depth and can record information at different distances or depths from the camera's lens. When viewing an image with information of interest at different distances from the lens, data processing occurs to retain or display, for a particular distance, only the image data for a particular distance. Other data, unrelated to that distance of interest, is discarded or not displayed. It is contemplated that image data for different distances, from the system 142, such as for example, D1, D2, D3, and D4, may be selectively displayed to the user. The resulting image data may be considered four-dimensional data since it records intensity data at two-dimensional planes located at different depths corresponding to different times, and the entire recording system may be considered a four-dimensional recording system Image information is captured by the image capture device 160 and is presented to an image processor 168. The image processor 168 may be part of the image capture device or a separate element, such as a computer. The camera 166 may be separable from the image processor, such as connected by a cable or other electrical interface. The image processor 168 (or the camera 166 if so configured) generates data regarding the images at each distance D1-D4. In some embodiments, this data may be overlayed to create a single composite image with each image 150 combined such that the composite image is in-focus for each image distance 150A-150D.

In another embodiment, the resulting image data is processed by the image processor 168 to generate individual images representing the light energy at each distance D1-D4. As a result, a user or viewer of the data may select which image 150A-150D to view. For example, the image processor would extract from the data set captured by the image capture device 160 only the intensity information from an in-focus image located at distance D1, and present only that image data, as an image or in some other format, to the user. Likewise, the image processor is configured to extract from the data set captured by the image capture device 160 only the information (light or energy) from an in-focus image located at distance D3, and present only that image data, either as data or as an image, to the user. This allows the user to collectively or individually view each set of light energy from different distances D1-D4.

Because a user may individually view the intensity data at D1, D2, D3, or D4, the user is also able to view the event at a time T1, T2, T3 or T4. Stated another way, the system records the event at different times by radiating the event with different wavelengths of light at different times within a chirped pulse. The different wavelengths of light illuminate the event sequentially at different times, and so each discrete wavelength translates to the time at which that wavelength illuminates the event. The reflected or transmitted pulse thus contains information from the event, each discrete instant captured using light at one discrete wavelength The pulse containing event information passes through the hyperchromatic system and the hyperchromatic system focuses the images at each wavelength at different distances from the hyperchromatic system. Thus, time during the event is translated to wavelength by the chirped pulse, and wavelength is translated to focal position by the hyperchromatic lens, the system thereby translating time during the event to focal position. The plenoptic camera records the data at each distance, for viewing and analysis by a user or computer system on an image by image (distance by distance) basis.

Processing by the image processor 168 occurs on the data from the camera to identified the data at each distance D1, D2, D3, and D4. In other embodiments, any number of images 150 may reside at fewer than four or greater than four distances. Image processing to perform such extraction may be generated or requested from a supplier of plenoptic cameras, holographic recording system or other party capable of such data processing.

For this example embodiment, initial design specifications define a field of view of less than 5 mm, under the assumption that magnifying achromatic optics could be used to relay an image of an actual phenomenon of interest to the object plane of the hyperchromatic system. In one embodiment, a magnification of between 5× and 10× was selected, to enable higher longitudinal chromatic dispersion while maintaining a reasonable final image size.

Figure 2:
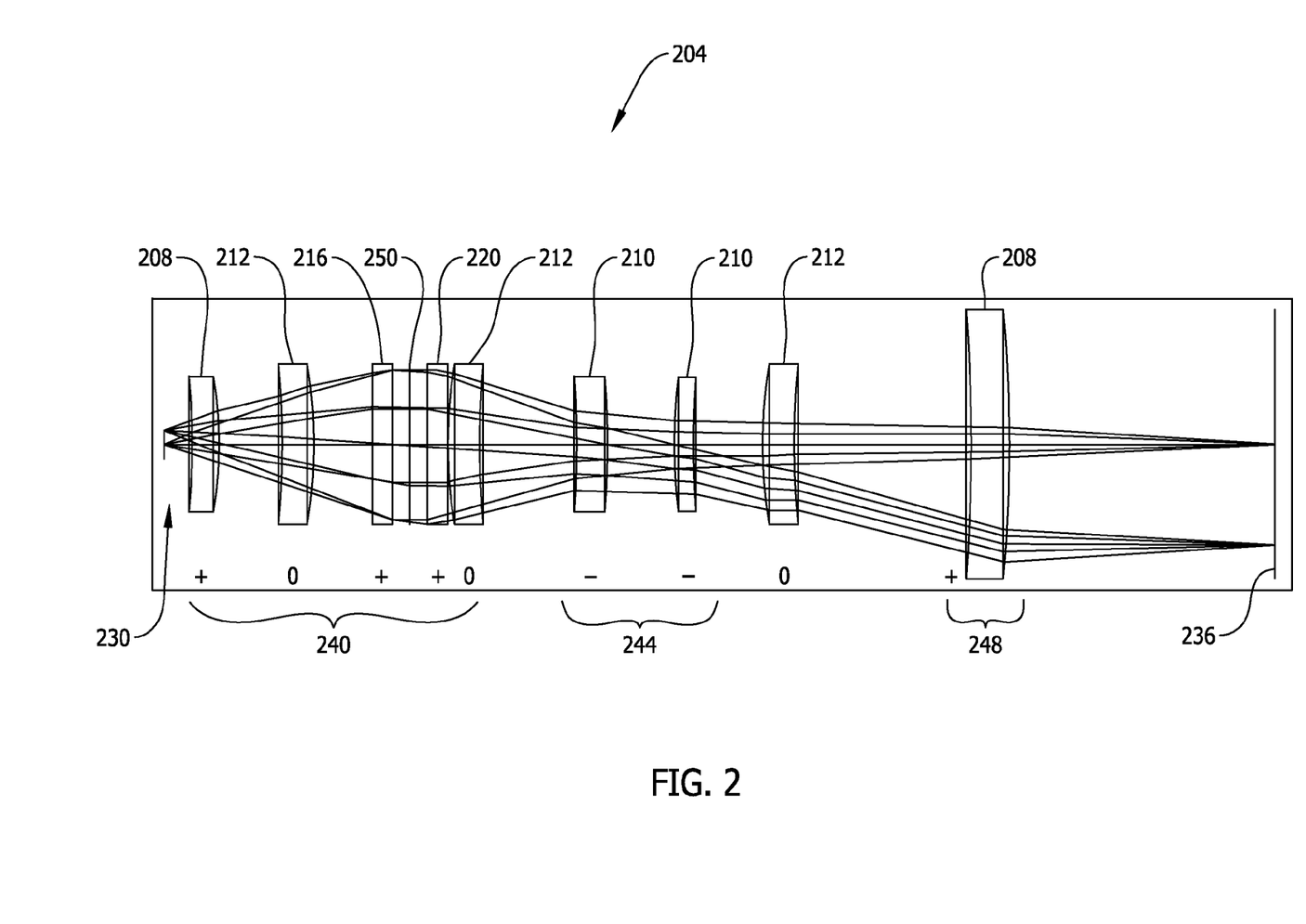
FIG. 2 is an exemplary lens arrangement for the hyperchromatic system shown in FIG. 1B.

In the exemplary embodiment a design approach incorporating diffractive dispersion is implemented. FIG. 2 is an exemplary lens arrangement for the hyperchromatic system with diffractive dispersion shown in FIG. 1B. The entire lens system shown in FIG. 2 is defined as the hyperchromatic system. In this figure, the lenses and the distances between the lenses are not to scale. In general, the vertical scale is approximately three times the horizontal scale for discussion and ease of illustration on a single page. As shown, the post-event light pulse is focused by a relay lens (not shown) at an intermediate image plane 230. The lens system 204 is composed of multiple lenses. In this example embodiment, numerous lenses form the hyperchromatic system 204 but in other embodiments, a single or fewer number of lenses may be used. The exemplary lens includes positive refractive lens elements 208, negative lens elements 210, neutral aberration-correcting lens elements 212, and one or more positive high-dispersion diffractive lenses 216, 220. In this example embodiment, there are two diffractive elements 216, 220 placed as shown in FIG. 2. A focus plane 236 is shown to indicate the image produced at a discrete arbitrary wavelength, and the location of the focus plane will change given a different discrete wavelength.

The hybrid hyperchromatic optical system as shown in FIG. 2, incorporates both diffractive and refractive components, and is configured to optimize both absolute longitudinal chromatic aberration and the linearity of such aberration with wavelength. Although custom diffractive elements can be tailored to induce arbitrary wavefronts, they are limited to relatively low power by manufacturing and material constraints, and so require additional refractive components for imaging and aberration control.

As diffractive elements 216, 220 have significantly higher characteristic dispersion than even the highest dispersion glasses, this exemplary hybrid design offers greater optical performance and dispersion than achievable in purely refractive designs. In this example embodiment, the two diffractive components are identical, but in other embodiments, these elements may differ. In this example embodiment, designs were established to have no more than 20 nm of bandwidth, with a desired bandwidth limit of less than 10 nm. Other embodiments may be configured with different bandwidths.

This exemplary design was designed for use with visible wavelengths to include light field recording technology as a viable method for recording produced image information. It is contemplated that other embodiments may be designed for use with non-visible wavelengths.

Another benefit and characteristic of this innovation is a high degree of linearity in the dispersion curve about the center design wavelength and constant magnification throughout the focal stack of produced images. Exemplary initial and developed characteristics are summarized in Table 1.

TABLE 1

Optical design requirements.

| Metric | Note | Example possible value range | As designed |
|---|---|---|---|
| Illumination center wavelength | Based on expectations of recording requirements | 500 to 800 nm | 532 nm |
| Illumination bandwidth | Based on availability of illumination sources | <20 nm (required) <10 nm (desired) | 5 nm |
| Field of view | Under the assumption that achromatic relay optics could magnify an actual object | 5 mm | 5 mm |
| Focal stack depth | To increase resolvability of image slices | >25 mm (required) >50 mm (desired) | 45 mm |

In a hybrid hyperchromatic optical system, the magnitude of the chromatic aberration is primarily driven by the power of the diffractive element. In the example embodiment of FIG. 2, two identical diffractive elements fabricated from acrylic plastic provide the chromatic aberration. Other embodiments may be configured with a single element and may be configured out of other materials. These two diffractive elements do not incorporate surfaces with refractive power, but could be so configured in other embodiments.

The performance of the diffractive lens pair 216, 220 was optimized by minimizing the angle of rays incident on both surfaces, by placing the diffractive lens pair symmetrically about the aperture stop 250 with equal angles on entering and exiting rays.

The embodiment of FIG. 2 with acrylic lens 216, 220, has a peak longitudinal chromatic aberration of nearly 9 mm/nm and a high degree of linearity at the peak. In this embodiment the linearity is <0.01 mm/nm$^2$ over more than 5 nm of bandwidth. This value establishes the system as requiring only 5 nm of input illumination bandwidth, significantly better than the threshold value of 10 nm. As a point of reference, the optical system will image an object over the entire visible spectrum over more than 1.5 meters of longitudinal distance.

Figure 3:
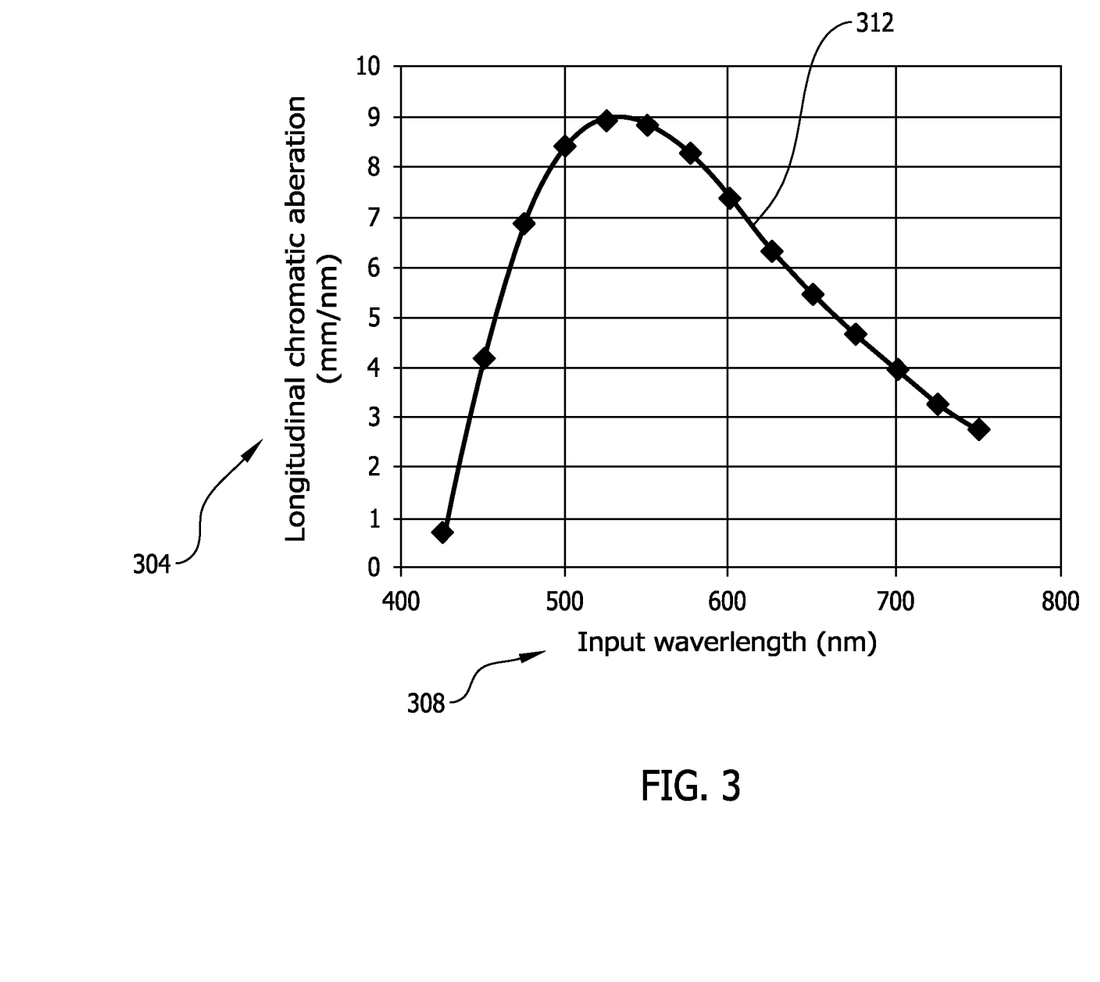
FIG. 3 illustrates the dispersion curve for the lens system of FIG. 2.

FIG. 3 illustrates the dispersion curve for the lens system of FIG. 2. This is one example dispersion curve and it is contemplated that other dispersion curves will be established for different embodiments. In FIG. 3, the vertical axis 304 represents longitudinal chromatic aberrations in millimeters per nanometer. The horizontal axis 308 represents input wavelength in nanometers. The dispersion curve 312 is shown by the plot. The lens and associated dispersion curve are engineered to provide maximum and near-flat dispersion at 532 nm.

In this embodiment, the lens system was designed for a 532 nm center wavelength, as this wavelength may be readily obtained in short-pulse lasers. However, it is contemplated that other potential laser sources and other types of potential experiments may utilize a different wavelength. In one configuration, the change in wavelength was obtained by changing lens spacing(s).

Returning to FIG. 2, the combination of optical performance with both magnitude and linearity of longitudinal chromatic aberration was obtained through a telephoto-type lens configuration. The embodiment shown in FIG. 2 has a first set 240 of optical elements with total positive power, a second set 244 of elements with total negative power, and a final single lens 248 with positive power. In this example embodiment, resulting magnification is −7.5 and constant over a bandwidth of 5 nm. This relatively high magnification achieves the large chromatic effect (distance separation between wavelengths at the different planes 236, but reduces the image-side ray bundles to approximately f/26. The positive set 240 of elements incorporates the two diffractive elements 216, 220, each of which has a clear aperture of 25 mm and a focal distance of 106.4 mm, as well as the system aperture stop. In this example embodiment, although the system contains nine discrete optical elements, three lenses are neutral lens elements 212 and have negligible optical power. In this exemplary configuration, these three identical neutral elements 212 (the second, fifth, and eighth elements from the left), as well as the remaining four non-diffractive elements, are menisci that serve to balance chromatic and non-chromatic aberrations induced by the diffractive components and to optimize imaging performance across the illumination spectrum. The diffractive elements 216, 220 are optimized for efficiency at the +1 order, and light in other orders diverges sufficiently so as not to produce ghost data.

Figure 4:
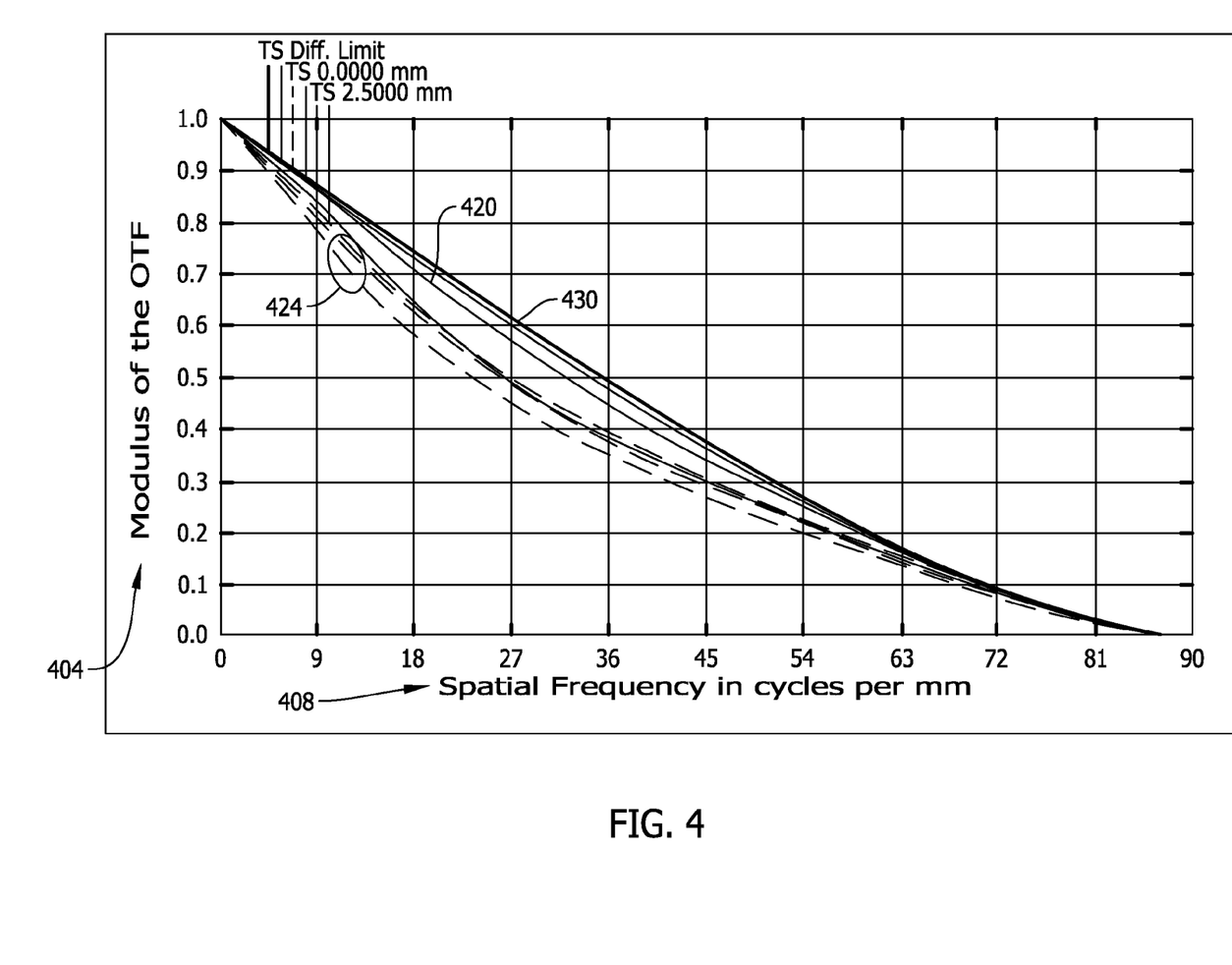
FIG. 4 illustrates an exemplary plot of superimposed MTF curves for different wavelengths (spatial frequency).

In this example embodiment, the lens system 204 provides near-diffraction-limited imaging at 532 nm, with a maximum optical resolution of greater than 52 line-pairs per mm (lp/mm) at 20% contrast across the 5 nm bandwidth, at the image. Given the magnification in this embodiment, this figure equals greater than 395 line-pairs per mm (lp/mm) at the object. FIG. 4 illustrates an exemplary plot of superimposed MTF (modulus transfer function) curves for different wavelengths (spatial frequency). As shown in FIG. 4, the vertical axis 404 represents modulus of the OTF (optical transfer function). The horizontal axis 408 represents spatial frequency in cycles per mm. These plots are established based on software modeling for frequencies between 0.5295 micrometers to 0.5345. Plot 420 indicates MTF curves for tangential rays for representative field points. Plot indicates MTF curves for sagittal rays for the same representative field points. Plot 430 is for the diffraction limit of the system. The superimposed MTF curves are for illumination light at 529.5 nm, 532 nm, and 534.5 nm.

The optomechanical aspects of the exemplary implementation of the lens 204 shown in FIG. 2 are not shown but are described below. The lens elements 208, 212, 216, 220 are held in place using retaining rings and split rings. The lenses were centered using centering pins, and RTV buttons were injected into the glue ports to keep the centration fixed. Optomechanical configuration and error tolerances account for the fact that the diffractive optical element does not have a curved (i.e., powered) surface that could help center the lens. As a result, the centration tolerance of the diffractive pattern on the flat surface is specified with respect to the outside diameter. The optical and optomechanical configurations were rigorously toleranced; as such, mechanical tolerances proved sufficient to ensure near-diffraction-limited performance for the lens system. For critical surfaces, these tolerances were 0.05 mm of runout and ±0.05 mm of axial position. The embodiment disclosed herein maintains sharp corners with minimal deburring for edges critical for centration and axial positioning.

In one embodiment, one or more surfaces had light-absorbing threads machined into the metal. In this exemplary embodiment, the thread type was a standard 20 pitch thread however, the system may be configured with a 'sharp V thread form (no flat), minimal deburr' configuration to minimize potential reflection and scattering from the truncated crests of standard thread forms. In other embodiment, other thread pitches may be used.

The diffractive components 216, 220 are orderable from Apollo Optical Systems, located in West Henrietta, N.Y., and the refractive components orderable from Optimax Systems, Inc., of Ontario, N.Y. The optomechanical housing for the components are orderable from Zero Hour Parts of Ann Arbor, Mich.

The hyperchromatic lens system and the illumination scheme described herein may be used on, and at time scales relevant to, experiments in shock studies and dynamic materials, such as, but not limited to, 10 ps-1 μs. As the temporal function of the hyperchromatic lens and recording medium relatively insensitive to the dimension of time, recording length is determined by the temporal characteristics of the illumination source. With a holographic medium, no additional timing method is necessary for recording, but with a digital medium, the camera needs to be actuated prior to recording, and continuously integrating over the duration of the illumination pulse.

For an application involving phenomena generated by sub-picosecond pulses, a light signal that is chirped to multiple picoseconds can be used to exhibit a clean chirp, i.e., a pulse in which a single wavelength is only present at a given instant, providing data that is temporally non-convolved.

In other embodiments, digital holography may be used as a 3-D recording method. However, it is possible that holography would add additional, undesirable, constraints on experimental. As an alternative, and as discussed above, plenoptic cameras employ image-plane lenslet arrays and oversampling to measure light as intensities and direction vectors, rather than merely intensity. Therefore, it is submitted that plenoptic cameras, with reconstruction algorithms, are able to digitally refocus discrete image planes from within the focal stack, perform digital determination of the longitudinal position of discrete planes, and create movies or image of recorded phenomena.

It is contemplated that a viable system (laser, lens, and plenoptic camera) may be configured to act as a partial edge filter such that the high f-number (f/26), low-frequency data in any image plane will still be imaged at nearby planes, whereas high-frequency data in a given plane will be unique to that plane. In one embodiment, the system of FIGS. 1A, 1B produces nine effective frames, but in other embodiments a greater or smaller number of images may be produced.

Figure 5:
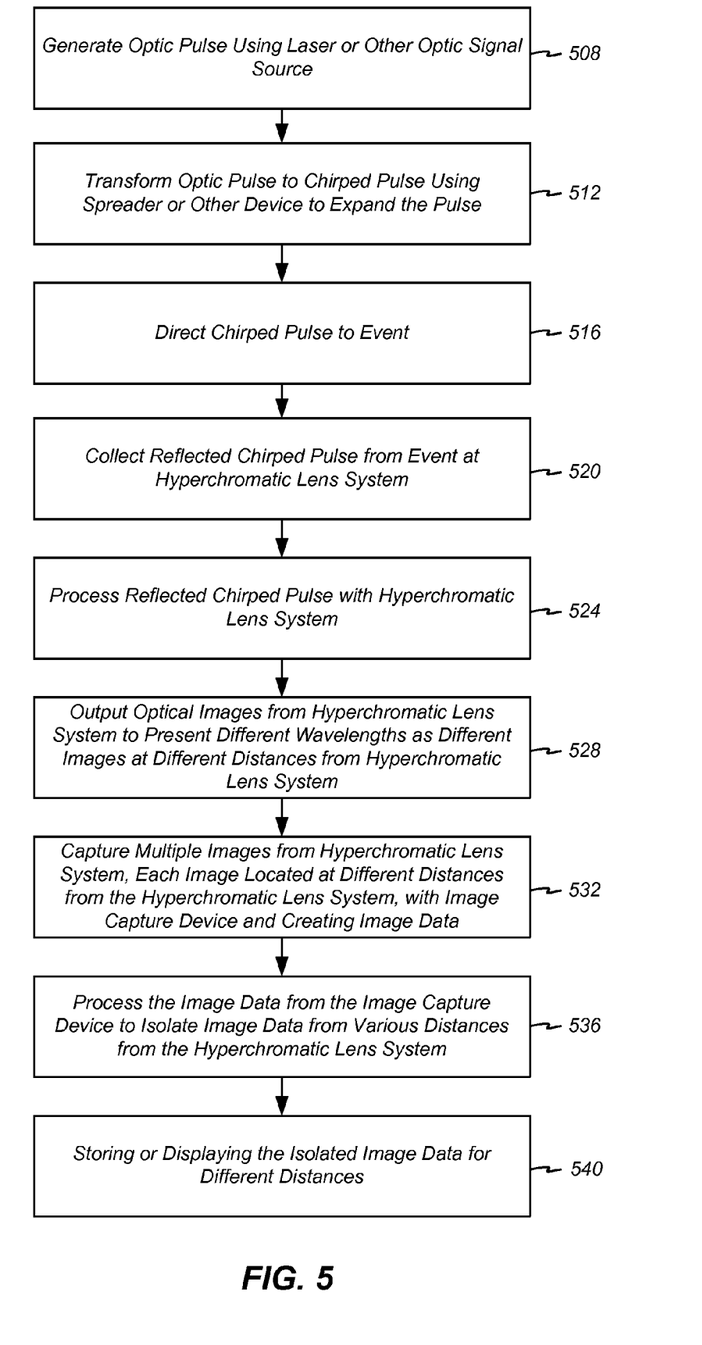
FIG. 5 illustrates an operational flow diagram of an exemplary method of operation of one example embodiment.

FIG. 5 illustrates an operational flow diagram of an exemplary method of operation. This is but one exemplary method of operation. Other methods of operation may be established without departing from the claims that follow. In this embodiment, at a step 508, the system generates an optical pulse, such as a light pulse, using a laser or other signal source. Although described with a light pulse and a laser, other embodiments may use other signal sources which may emit a signal that is within or outside of the visible light spectrum. The pulse is directed to a stretcher.

At a step 512, the pulse stretcher receives the pulse and transforms the pulse into a chirped pulse. The pulse stretcher may comprise any device capable of expanding the pulse to create a chirped pulse. In one embodiment, the generation of the pulse and the chirping of the pulse is combined into a single step, such that at step 508 a chirped pulse is directly created.

At a step 516, the chirped pulse is directed to an event of interest. The event may be any event, but it is expected that the event, or aspects of the event of interest, will be of short duration. The chirped pulse may be projected directly on the event, or directed to the event using one or mirrors or one or more lenses.

At the event, the pulse reflects from the event and at a step 520 the hyperchromatic lens system collects or receives the reflected chirped pulse from the event. At a step 524, the hyperchromatic lens system processes the reflected chirped pulse (modified chirped pulse) from the event. In one embodiment, the processing comprises passing the reflected chirped pulse through one or more lenses, one of which includes a high-dispersion element. In this embodiment, processing of the reflected chirped pulse includes outputting the reflected chirped pulse as two or more images of the event, with different wavelengths of the reflected chirped pulse being focused or located at different distances from the hyperchromatic lens system. This occurs at step 528.

At a step 532, one or more image capture system captures the two or more images from the hyperchromatic lens system such that each image is located at a different distance from the hyperchromatic lens system. Any type or number of image capture devices may be used to capture the image, but in one embodiment a plenoptic camera is used to simultaneously or sequentially capture the image data at different depths or distances from the hyperchromatic lens system.

Next, at step 536 one or more image processing devices, for example a general purpose computer executing machine readable code, such as software stored in a non-transitory format on a memory, or a specialized processing device, processes the image data from the image capture device. It is contemplated that such image data may be generated in a digital camera system but it is contemplated that the image data may be recorded on film and processed in a traditional film based work flow. In a digital camera environment, the processing isolates the image data located one or more distances from the hyperchromatic lens system. Once isolated, the image data may be viewed independent of the other image data or combined with the other image data in still or movie format. This allows viewing of image data based on the wavelength of the light in the reflected chirped pulse, which can in turn be correlated to time in relation to progression of the event, which is considered to be dynamic.

At a step 540, the image data is stored, displayed, or both. Displaying of the image data may occur graphically as either a static image or a moving, sequenced video. This allows viewing of the ultrafast event to gain a better understanding of the event.

The following references are incorporated by reference in their entirety.

[1] Goda, K., Tsia, K. K. and Jalali, B., "Serial time-encoded amplified imaging for real-time observation of fast dynamic phenomena," Nature 458, 1145-1149 (2009).

[2] Velten, A., Raskar, R. and Bawendi, M., "Picosecond camera for time-of-flight imaging," Imaging Systems Applications, OSA Technical Digest, Optical Society of America (2011).

[3] Gunther, C. M., Pfau, B., Mitzner, R., Siemer, B., Roling, S., Zacharias, H., Kutz, O., Rudolph, I., Schondelmaier, D., Treusch, R. and Eisebitt, S., "Sequential femtosecond x-ray imaging," Nature Photonics 5, 99-102 (2011).

[4] Garzon J., Meneses, J., Tribillon, G., Gharbi, T. and Plata, A., "Chromatic confocal microscopy by means of continuum light generated through a standard single-mode fiber," J. Opt. A: Pure Appl. Opt. 6(6), 544 (2004).

[5] Carrasco-Zevallos, O., Shelton, R. L., Olsovsky, C., Saldua, M., Applegate, B. E. and Maitland, K. C. "Exploiting chromatic aberration to spectrally encode depth in reflectance confocal microscopy," Proc. SPIE 8086, doi:10.1117/12.889806 (2011).

[6] Mikš, A., Novák, J. and Novák, P., "Theory of chromatic sensor for topography measurements," Proc. SPIE 6609, doi:10.1117/12.739529.

[7] Hillenbrand, M., Mitschunas, B., Wenzel, C., Grewe, A., Ma, X., Feßer, P., Bichra, M. and Sinzinger, S., "Hybrid hyperchromats for chromatic confocal sensor systems," Advanced Optical Technologies 1(3), 187-194 (2012).

[8] Richey C. A., "Aerospace mounts for down to earth optics," Machine Design 46, 121-127 (1978).

What is claimed is:

1. A system for recording high speed events comprising:
a chirped pulse source configured to generate a chirped pulse, the chirped pulse directed to an event to create a reflected chirped pulse;
a hyperchromatic lens system configured to receive the reflected chirped pulse and output two or more images focused at different distances from the hyperchromatic lens system;
one or more image capture systems configured to record the two or more images which are focused at different distances from the hyperchromatic lens system to create and store image data.

2. The system of claim 1 wherein the chirped pulse source comprises a laser and optical pulse stretcher.

3. The system of claim 1 wherein the hyperchromatic lens system comprises a lens system with at least one high-dispersion element.

4. The system of claim 3 wherein the at least one high-dispersion element comprises two diffractive elements formed from an optically transparent medium.

5. The system of claim 1 wherein the chirped pulse contains 5 nm of bandwidth.

6. The system of claim 1 wherein the image capture system is a plenoptic lens system and camera.

7. The system of claim 1 further comprising a processor configured to execute machine readable code, the machine readable code stored on a memory and configured to process the image data to isolate and display a first image and a second image from the two or more images.

8. The system of claim 1 wherein the hyperchromatic lens system produces a focal stack in which the spatial dimension of stacking, or axial distance relative to the hyperchromatic lens, corresponds to time within the reflected chirped pulse.

9. A hyperchromatic lens system for recording time-resolved phenomena comprising:
a pulse generator configured to generate a pulse;
a pulse stretcher configured to stretch the pulse to create a chirped pulse, the chirped pulse being directed to a time-resolved phenomena to interact with the time resolved phenomenon which creates a modified chirped pulse;
a hyperchromatic lens system configured to:
receive the modified chirped pulse representing information about the time-resolved phenomenon;
process the modified expanded pulse representing information about the time-resolved phenomenon to create two or more independent images which are established at different distances from the hyperchromatic lens system; and
an image capture system configured to capture and store the two or more independent images as image data.

10. The system of claim 9, wherein the pulse is an optical pulse in the visible light spectrum.

11. The system of claim 9, wherein the pulse stretcher is multiple grating structure.

12. The system of claim 9, wherein the hyperchromatic lens system comprises a multiple lens system configured with at least two diffractive elements.

13. The system of claim 9, wherein the image capture system is a plenoptic camera or a holographic image capture system.

14. The system of claim 9, further comprising a processor configured to receive the image data and process the image data to isolate and individually display at least one of the two or more independent images.

15. A method for capturing high speed image information regarding an event comprising:
providing a pulse to an event, the pulse interacting with the event to create a modulated pulse, the modulated pulse representing the pulse's interaction with the event, such that the event at a first time is associated with a first wavelength of the modulated pulse and the event at a second time is associated with a second wavelength of the modulated pulse;
receiving the modulated pulse at a hyperchromatic system;
outputting the modulated pulse from the hyperchromatic system such that the first wavelength is presented as a first image at a first distance from the hyperchromatic system and the second wavelength is presented as a second image at a second distance from the hyperchromatic system;
recording the first image and the second image with an image capture device to create image capture device data.

16. The method of claim 15 wherein the pulse is a chirped pulse.

17. The method of claim 15 wherein the pulse is from a laser and the method further comprises presenting light energy from a laser to a pulse stretcher to transform the light energy of the pulse into a chirped pulse, the chirped pulse both stretched in time and chirped relative to the pulse.

18. The method of claim 15 wherein the image capture device comprises a plenoptic camera.

19. The method of claim 15 wherein the hyperchromatic system comprises a lens system including at least one diffractive element.

20. The method of claim 15 further comprising:
processing the image capture device data to isolate first image data from the image capture device data
processing the image capture device data to isolate second image data from the image capture device data;
displaying only the first image data on a display screen; and
displaying only the second image data on a display screen.

21. The method of claim 15, wherein the first distance and the second distance define a maximum distance between images and the maximum distance is greater than 1 meter.

* * * * *